(12) United States Patent
Gaully et al.

(10) Patent No.: US 9,261,024 B2
(45) Date of Patent: Feb. 16, 2016

(54) METHOD AND A DEVICE FOR PRODUCING A SETPOINT SIGNAL

(75) Inventors: Bruno Robert Gaully, Marolles en Hurepoix (FR); Alexandra Riou, Loguivy de la Mer (FR); Cedrik Djelassi, Marolles en Hurepoix (FR)

(73) Assignee: SNECMA, Paris (FR)

(*) Notice: Subject to any disclaimer, the term of this patent is extended or adjusted under 35 U.S.C. 154(b) by 742 days.

(21) Appl. No.: 13/640,819

(22) PCT Filed: Apr. 12, 2011

(86) PCT No.: PCT/FR2011/050830
§ 371 (c)(1),
(2), (4) Date: Jan. 7, 2013

(87) PCT Pub. No.: WO2011/128573
PCT Pub. Date: Oct. 20, 2011

(65) Prior Publication Data
US 2013/0091851 A1 Apr. 18, 2013

(30) Foreign Application Priority Data
Apr. 15, 2010 (FR) ...................................... 10 52882

(51) Int. Cl.
*F02C 9/26* (2006.01)
*F02C 7/22* (2006.01)
*F02C 7/232* (2006.01)

(52) U.S. Cl.
CPC . *F02C 7/22* (2013.01); *F02C 9/263* (2013.01); *F02C 7/232* (2013.01)

(58) Field of Classification Search
CPC .............. F02C 7/22; F02C 7/232; F02C 9/26; F02C 9/263; F02C 9/48; F02C 9/50
See application file for complete search history.

(56) References Cited

U.S. PATENT DOCUMENTS

| 4,697,238 A | * | 9/1987 | Barbeau | ..................... F02C 7/22 60/243 |
| 5,115,635 A | * | 5/1992 | Jennings | ................... F02C 9/26 60/39.281 |

(Continued)

FOREIGN PATENT DOCUMENTS

EP          1 510 795          3/2005

OTHER PUBLICATIONS

International Search Report issued Apr. 8, 2011 in PCT/FR11/050830 Filed Apr. 12, 2011.

*Primary Examiner* — Ehud Gartenberg
*Assistant Examiner* — Lorne Meade
(74) *Attorney, Agent, or Firm* — Oblon, McClelland, Maier & Neustadt, L.L.P.

(57) ABSTRACT

A method and device producing a setpoint signal representing a flow rate of fuel that a metering unit having a slide valve is to supply to a fuel injection system of a combustion chamber in a turbine engine, the position of the valve depending on the setpoint signal. The method: obtains a first signal representing a measurement as delivered by a flow meter of a flow rate of fuel injected into the chamber; evaluates a second signal representing the flow rate of fuel injected into the chamber based on a measurement of the position of the valve; estimates a third signal representative of the measurement delivered by the flow meter by applying a digital model of the flow meter to the second signal; and produces the setpoint signal by adding a compensation signal to the first signal, the compensation signal obtained by subtracting the third signal from the second signal.

8 Claims, 3 Drawing Sheets

(56) References Cited

U.S. PATENT DOCUMENTS

| | | | | |
|---|---|---|---|---|
| 5,303,541 A * | 4/1994 | Goff | ............... | F02C 7/262 60/773 |
| 5,305,597 A | 4/1994 | Snow | | |
| 6,148,601 A * | 11/2000 | Jones | ............... | F02C 9/28 60/39.281 |
| 6,882,924 B2 * | 4/2005 | Miller | ............... | F02C 9/263 477/30 |
| 7,082,842 B2 * | 8/2006 | Kielb | ............... | G01F 1/42 73/861.53 |
| 7,107,169 B2 * | 9/2006 | Vary | ............... | F02C 9/26 700/282 |
| 9,091,217 B2 * | 7/2015 | Hodinot | ............... | F02C 7/232 |
| 2005/0043905 A1 | 2/2005 | Vary | | |
| 2013/0008171 A1 * | 1/2013 | Djelassi | ............... | F02C 9/28 60/772 |
| 2013/0186096 A1 * | 7/2013 | Andre | ............... | F02C 7/232 60/772 |
| 2013/0213053 A1 * | 8/2013 | Gaully | ............... | F02C 7/232 60/776 |

* cited by examiner

METHOD AND A DEVICE FOR PRODUCING A SETPOINT SIGNAL

BACKGROUND OF THE INVENTION

The present invention relates to the general field of turbine engines. It applies in preferred but non-limiting manner to the field of aviation.

More particularly, the invention relates to a method and a device for producing a setpoint signal for use in a servo-control loop controlling a fuel metering device in a turbine engine such as a turbojet. Typically, the setpoint signal is a signal representative of a fuel mass flow rate that is to be supplied by the metering device to a fuel injection system of a combustion chamber of the turbine engine.

In known manner, the fuel metering device of a turbine engine has a valve, also referred to as a fuel metering valve (FMV), and the position of the valve is proportional to the fuel flow rate that is to be injected into the combustion chamber so long as the pressure difference across the valve is kept constant.

An estimate of the fuel mass flow rate that is to be injected into the combustion chamber is evaluated by the turbine engine computer and is supplied to the metering device in the form of a setpoint signal. One technique that is conventionally used for identifying the position of the valve on the basis of the estimated mass flow rate supplied by the computer is as follows.

On being moved, the valve obstructs a fuel flow section S through the metering device to a greater or lesser extent. The section S is also referred to as the aperture area of the metering device and it is easily expressed as a function of the position of the valve.

In known manner, this area S is proportional to the volume flow rate of the fuel. This is obtained by taking the mass flow rate setpoint signal supplied by the computer and dividing it by the density (mass per unit volume) of the fuel flowing through the metering device.

The density of the fuel is generally assumed to be constant throughout the mission of the turbine engine, and to be predetermined.

Unfortunately, that assumption does not take account of any possible change in the nature of the fuel used or any variation in the temperature of the fuel while the turbine engine is in operation. As a result it leads to inaccuracies in the evaluation of the position of the valve of the metering device.

There thus exists a need to have a technique that enables the fuel fed to a turbine engine to be metered accurately without suffering from the above-mentioned drawbacks, and in particular to produce a setpoint signal that is accurate for servo-controlling the metering device.

Document U.S. Pat. No. 5,305,597 proposes a method of producing a setpoint signal for a fuel metering device that makes use of a measurement delivered by a flow meter of the flow rate that is injected into the combustion chamber. That measurement is used for estimating a calibration signal proportional to the instantaneous density of the fuel.

The calibration signal serves to adjust the mass flow rate setpoint signal as evaluated on the basis of the position of the valve of the metering device. It is updated whenever, on the basis of a predefined criterion, it is determined that the measurement delivered by the flow meter is sufficiently accurate, i.e. typically once the measured flow rate is sufficiently large and varies little.

OBJECT AND SUMMARY OF THE INVENTION

The present invention proposes a method that is an alternative to the method described in document U.S. Pat. No. 5,305,597, and that serves to improve the accuracy with which fuel is metered in a turbine engine.

In a first aspect, the invention provides a production method for producing a setpoint signal representative of a flow rate of fuel that a fuel metering device having a slide valve is to supply to a system for injecting fuel into a combustion chamber of a turbine engine, the position of the valve of the metering device being determined on the basis of the setpoint signal and said method comprising:

- a step of obtaining a first signal representative of a measurement as delivered by a flow meter of a flow rate of fuel injected into the combustion chamber;
- a step of evaluating a second signal representative of the flow rate of fuel injected into the combustion chamber on the basis of a measurement of the position of the valve of the metering device;
- a step of estimating a third signal representative of the measurement delivered by the flow meter by applying a digital model of the flow meter to the second signal; and
- a step of producing the setpoint signal by adding a compensation signal to the first signal, the compensation signal being obtained by subtracting the third signal from the second signal.

Correspondingly, the invention also provides a production device for producing a setpoint signal representative of a fuel flow rate that a fuel metering device having a slide valve is to supply to a fuel injection system of a combustion chamber in a turbine engine, the position of the valve of the metering device being determined from the setpoint signal, said device comprising:

- means for obtaining a first signal representative of a measurement as delivered by a flow meter of a fuel flow rate injected into the combustion chamber;
- means for evaluating a second signal representative of the flow rate of fuel injected into the combustion chamber on the basis of a measurement of the position of the valve of the metering device;
- means for estimating a third signal representative of the measurement delivered by the flow meter by applying a digital model of the flow meter to the second signal; and
- means for producing the setpoint signal by adding a compensation signal to the first signal, the compensation signal being obtained by subtracting the third signal from the second signal.

The invention thus proposes combining two signals to improve the accuracy with which fuel is metered in a turbine engine, i.e. firstly a signal produced on the basis of the position of the valve of the metering device (i.e. the signal conventionally used for regulating the fuel flow rate), and secondly a signal delivered by a flow meter suitable for measuring the flow rate of fuel injected into the combustion chamber. By way of example, the flow meter is a weight flow meter (WFM) such as a torque meter, or it is a volume flow meter, both of which are known in themselves. It is preferable to select a flow meter that is capable of accurately measuring the absolute value (i.e. the exact value) of the flow rate of fuel passing therethrough, in order to compensate for lack of accuracy concerning the absolute value in the signal obtained on the basis of the position of the valve of the metering device.

In contrast, it should be observed that there is no need for the flow meter to have a time constant that is short. In known manner, the time constant of a sensor characterizes its response time, i.e. its inertia. This inertia gives rise to an offset in time between the moment when the measurement is performed by the sensor and the moment when the sensor delivers a signal in response to the measurement.

The signal obtained from the position of the valve of the metering device is accurate in relative value (i.e. it provides an accurate representation of dynamic variation in the fuel flow rate over time), and it can therefore serve advantageously to compensate for the inertia of the flow meter.

The invention thus makes it possible to combine the advantageous characteristics of measurements derived from the flow meter and measurements derived from the metering device.

The flow meter is preferably located close to the valve of the metering device, in series therewith, so that the flow of fuel passing through the valve of the metering device and the flow of fuel passing through the flow meter are both at substantially the same temperature. This improves the accuracy of the setpoint signal produced in accordance with the invention.

In a variant, the temperature difference may be incorporated in the digital model of the flow meter that is used for estimating the third signal.

Using the flow meter in accordance with the invention gives rise to redundancy compared with the measurement performed by the metering device, thereby making it possible to improve the accuracy of the setpoint signal. Constraints in terms of accuracy can therefore be relaxed for the metering device, thereby making it possible to reduce the costs associated with equipment fitted to the turbine engine.

The improvement in the accuracy of the setpoint signal, and as a result in the accuracy with which fuel injected into the combustion chamber is metered, presents various advantages that are not negligible. For a turbojet, these advantages are in particular as follows:

- the high pressure compressor is easier to design;
- the lifetime of the high pressure compressor is increased, and consequently the operating range of the turbojet is also increased with reference to its pumping and extinction limits;
- the flow meter can be used for detecting disturbances at the outlet from the metering device that are associated with variable geometry that is not detectable by the metering device;
- relaxing certification constraints on the metering device;
- improving the efficiency of the high pressure compressor; etc.

In a particular implementation of the invention:

- the first signal is in the form of steps and is filtered by a lowpass digital filter suitable for smoothing the steps prior to being added to the compensation signal; and
- the third signal is filtered by the lowpass digital filter before being subtracted from the second signal in order to form the compensation signal.

Correspondingly, in this implementation, the first signal presents a waveform with steps, and said production device further comprises a first lowpass digital filter suitable for smoothing the steps of the first signal and a second digital filter similar to the first filter, the first signal being filtered by the first filter before being added to the compensation signal, and the third signal being filtered by the second filter before being subtracted from the second signal to form the compensation signal.

The invention thus makes it possible to take account of the particular features of the flow meter and in particular the characteristics of the signal it delivers, i.e. in this example a signal that is in the form of steps. A torque meter is an example of a flow meter that delivers signals in steps.

Nevertheless, the invention also applies to other types of signal (and thus to other types of flow meter), providing a digital filter is used that is adapted to the waveform of the signals. Adapting the digital filter to the waveform of the signals does not in itself present any difficulty for the person skilled in the art.

The time constant of the first digital filter is selected to be sufficiently long to enable the steps to be smoothed while limiting oscillations of the resulting signal at the output from the filtering. The delay introduced by the first filter as a result of making this selection is compensated in the invention by filtering the third signal by means of a filter that is similar to the first filter, prior to subtracting it from the second signal in order to form the compensation signal.

In a second aspect, the invention provides a supply method for supplying a setpoint signal to a fuel metering device having a slide valve in a turbine engine, the position of the valve of the metering device being determined from the setpoint signal, said method comprising:

- a step of producing a first setpoint signal by using the production method in accordance with the invention;
- if the first setpoint signal is greater than a predetermined threshold, a step of supplying the first setpoint signal to the fuel metering device;
- else, a step of supplying the fuel metering device with a second setpoint signal obtained at least from the second signal.

Correspondingly, the invention also provides a supply system for supplying a setpoint signal to a fuel metering device having a slide valve in a turbine engine, the position of the valve of the metering device being determined from the setpoint signal, said system comprising:

- a production device for producing a first setpoint signal in accordance with the invention;
- comparator means for comparing the first setpoint signal with a predetermined threshold; and
- means for supplying the fuel metering device with:
  - the first setpoint signal if it is greater than the predetermined threshold; or
  - a second setpoint signal obtained from at least the second signal, otherwise.

The invention thus makes it possible to compensate for the inaccuracy of the flow meter when it is passing fuel flow rates that are too small, by switching over to a setpoint signal that is produced on the basis of the position of the valve of the metering device, in particular.

By way of example, when the first setpoint signal is less than the predetermined threshold, the second setpoint signal supplied to the fuel metering device may result from a combination between the second signal and the first setpoint signal.

This combination may in particular be a linear combination or a combination that is more complex and based on a polynomial. Preferably, a combination is selected that provides a progressive transition between the second setpoint signal and the first setpoint signal in order to avoid a phenomenon of the turbine engine pumping, which phenomenon is itself known.

In a third aspect, the invention also provides a turbine engine including a system in accordance with the invention for supplying a setpoint signal to a fuel metering device having a valve.

BRIEF DESCRIPTION OF THE DRAWINGS

Other characteristics and advantages of the present invention appear from the following description given with reference to the accompanying drawings that show an embodiment having no limiting character. In the figures.

DETAILED DESCRIPTION OF AN EMBODIMENT

Figure 1:
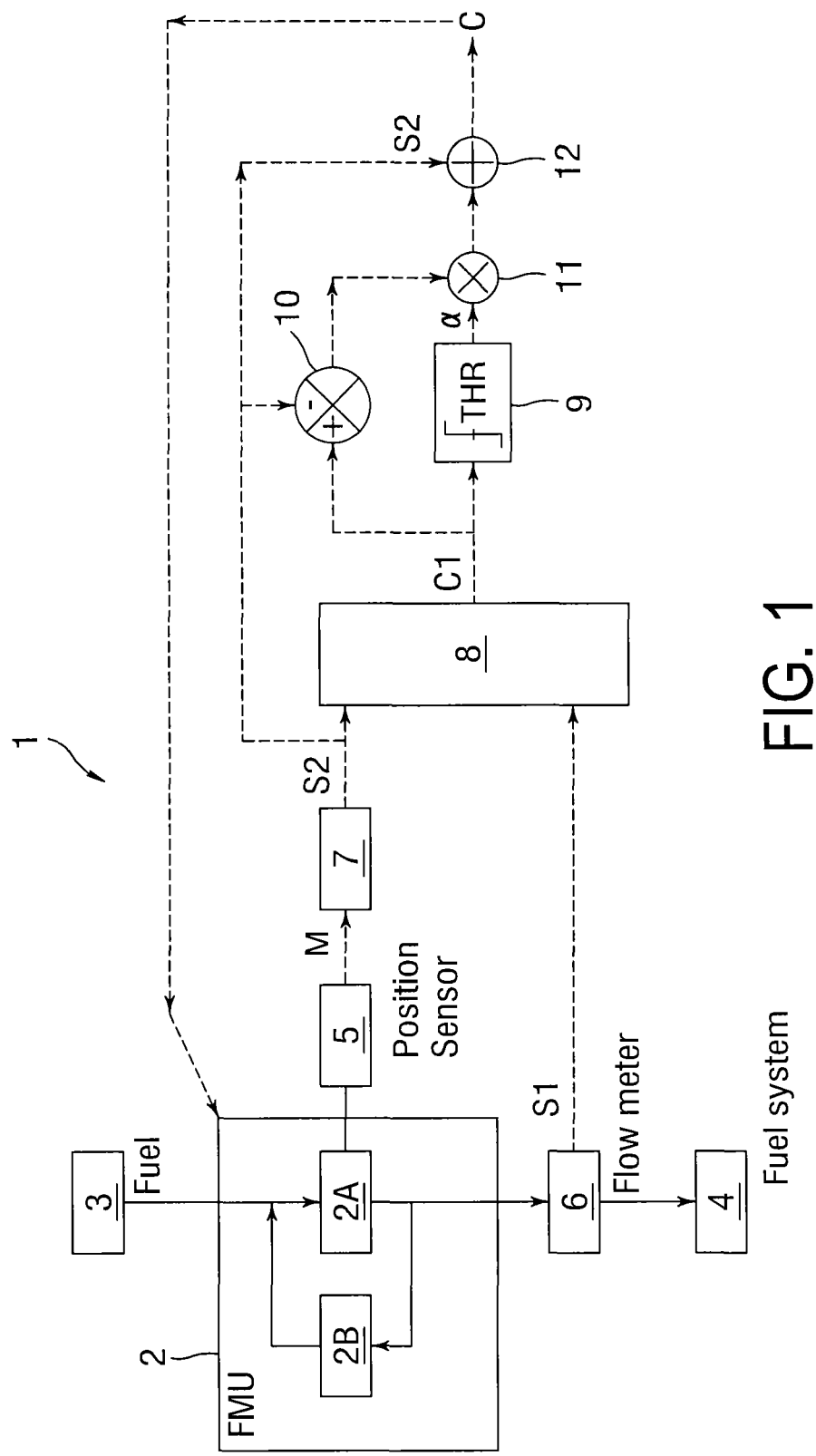
FIG. 1 is a diagram showing a supply system of the invention for supplying a setpoint signal to a fuel metering device in a turbine engine, together with the main steps of a supply method in a particular implementation for supplying a setpoint signal in accordance with the invention.

FIG. 1 shows, in its environment, a system 1 for supplying a setpoint signal to a fuel metering device 2 for a turbojet propelling an airplane (not shown), in a particular embodiment of the invention.

Nevertheless, this situation is not limiting and the invention applies equally well to other turbine engines such as for example a turboprop, and to other types of aircraft.

In known manner, the fuel metering device 2, often called a "metering unit", serves to adjust the quantity of fuel coming from the fuel circuit 3 of the airplane and delivered by the fuel injector system 4 to the combustion chamber of the turbojet (not shown).

For this purpose, the unit 2 is provided with a slide valve 2A or "fuel metering valve" (FMV) of position that varies as a function of the flow rate at which fuel is to be injected into the combustion chamber. On being moved, the valve obstructs a fuel flow section, referenced S, and also referred to as the aperture area of the metering device. It should be observed that the relationship between the area S and the position of the valve is itself known and is not described in greater detail herein.

The area S is proportional to the volume flow rate Qv of fuel injected into the combustion chamber, i.e.:

$$Qv = KS\sqrt{\Delta P}$$

where K designates a constant and $\Delta P$ is the pressure difference in the metering unit 2 that exists across the valve 2A. This pressure difference is kept constant by a regulator valve 2B that is itself known.

The volume flow rate Qv is obtained by dividing the mass flow rate Qm by the density p of the fuel flowing through the metering device. The density p is assumed in this example to be constant.

The mass flow rate Qm is transmitted by the system 1 to the metering unit 2 in the form of a setpoint signal C via a servo-control loop (not shown). The system 1 in this example is incorporated in the turbojet computer.

In accordance with the invention, and in order to evaluate the setpoint signal C that should be supplied to the metering unit, the supply system 1 acts in two stages.

In a first stage, it acts at each sampling instant to evaluate a first setpoint signal C1 on the basis firstly of a measurement M of the position of the valve 2A as delivered by a position sensor 5, and secondly of a measurement signal S1 representative of the flow rate of fuel injected into the combustion chamber, as delivered by a weight flow meter (WFM) 6.

By way of example, the position sensor 5 is a linear variable differential transformer (LVDT) known to the person skilled in the art. The measurement M is then transformed by a converter 7, likewise known, into a signal S2 representative of a mass flow rate.

The signals S1 and S2 constitute respectively a first signal and a second signal in the meaning of the invention.

The WFM 6 has a time constant written τ6. In this example it is connected in series with the metering unit 2, in the immediate proximity thereof. As a result, the temperature of the fuel is substantially the same when it passes through the metering unit 2 and when it passes through the WFM 6. Since a WFM constitutes equipment that is known to the person skilled in the art, its operation is not described in greater detail herein.

The setpoint signal C1 is produced on the basis of the signals S1 and S2 by a production device 8 of the system 1 in accordance with the invention and described in greater detail below with reference to FIG. 2.

In a second stage, the system 1 determines whether the setpoint signal C1 is sufficiently accurate to be sent to the metering unit 2 via the servo-control loop. Below a certain flow rate, and because of its inertia, the WFM 6 is less accurate than the metering device 2 in evaluating the flow rate injected into the combustion chamber.

Thus, the setpoint signal C1 is compared with a threshold THR by a known comparator 9. In this example, the comparator 9 issues a signal written α (alpha) that is at a high level (digital "1") if the signal C1 is greater than the threshold THR, and at a low level (digital "0") otherwise.

The comparator is for detecting low fuel flow rates at which the accuracy of the WFM 5 is insufficient and does not enable a reliable measurement to be obtained of the mass flow rate being injected into the combustion chamber 4. The threshold THR is predetermined (e.g. THR=450 kilograms per hour (kg/h)), and is selected as a function of the accuracy and the time constant of the flow meter 6.

In the presently-described example, if the signal α (alpha) is equal to 1, then the system 1 supplies the signal C1 as evaluated by the device 8 to the metering unit as its setpoint signal C. In contrast, if the signal α (alpha) is equal to 0, then the system 1 supplies the signal S2 delivered by the position sensor 5 and the converter 7 as the setpoint signal C.

In this example, this operation is performed by means of:
  a subtracter element 10 adapted to subtracting the signal S2 from the signal C1;
  a multiplier element 11 adapted to multiplying the signal from the subtracter element by the signal α (alpha); and
  an adder element 12 adapted to adding the signal S2 to the signal from the multiplier element 11.

It should be observed that in the presently-described example, the setpoint signal C supplied by the system 1 is either the setpoint signal C1 produced by the device 8 or else the signal S2. In a variant, it is possible for the system 1 to supply the metering unit 2 with a combination of the signals S2 and C1 as the setpoint signal C.

The combination may in particular be a linear combination of the signals C1 and S2. For this purpose, the comparator 9 may for example deliver a signal α (alpha) that is real, i.e. that has a value that depends on the difference between the signal C1 and the threshold THR. This serves to provide a transition from the signal S2 delivered by the converter 7 to the signal C1 produced by the device 8, that takes place progressively with increasing flow rate of fuel being injected into the combustion chamber.

In a variant, other devices may be used for weighting the way in which the signals C1 and S2 are combined, for example using a filter of order greater than 1.

Figure 2:
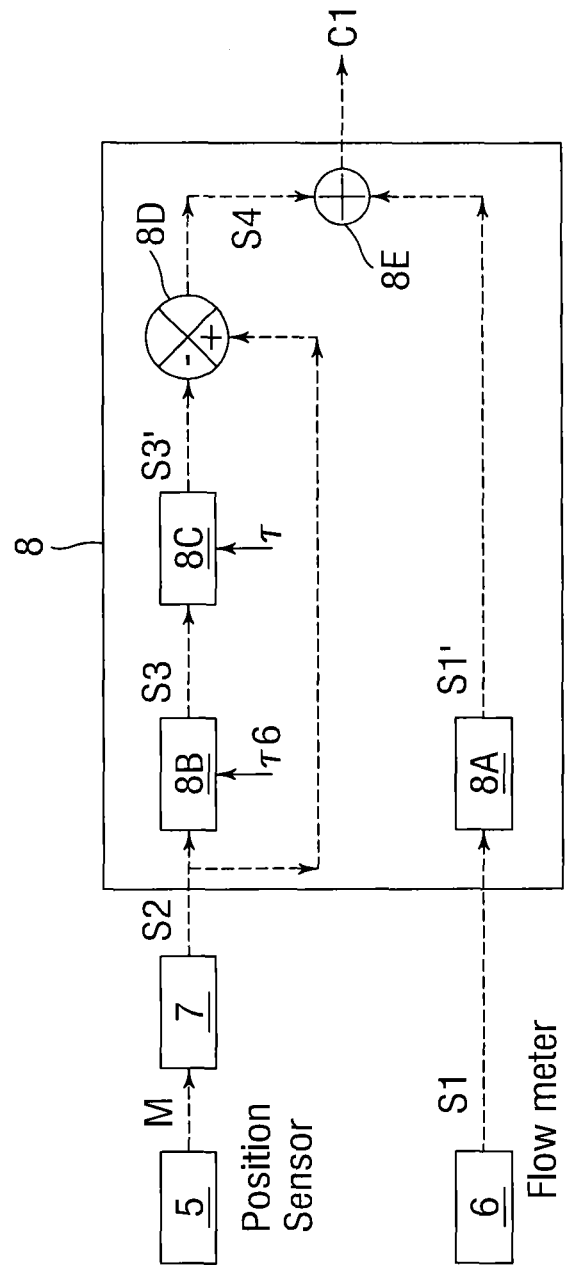
FIG. 2 shows a production device in accordance with the invention for producing a setpoint signal in a particular embodiment in which the device is incorporated in the supply system shown in FIG. 1, and also showing the main steps of a production method in accordance with the invention for producing a setpoint signal.

With reference to FIG. 2, there follows a description of the main steps implemented by the device 8 and leading to the production of the setpoint signal C1.

As mentioned above, and in accordance with the invention, in order to produce the setpoint signal C1, the device 8 makes use firstly of the signal S1 delivered by the flow meter, and secondly of the signal S2 delivered by the converter 7 and evaluated on the basis of the position M of the valve 2A.

Figure 3:
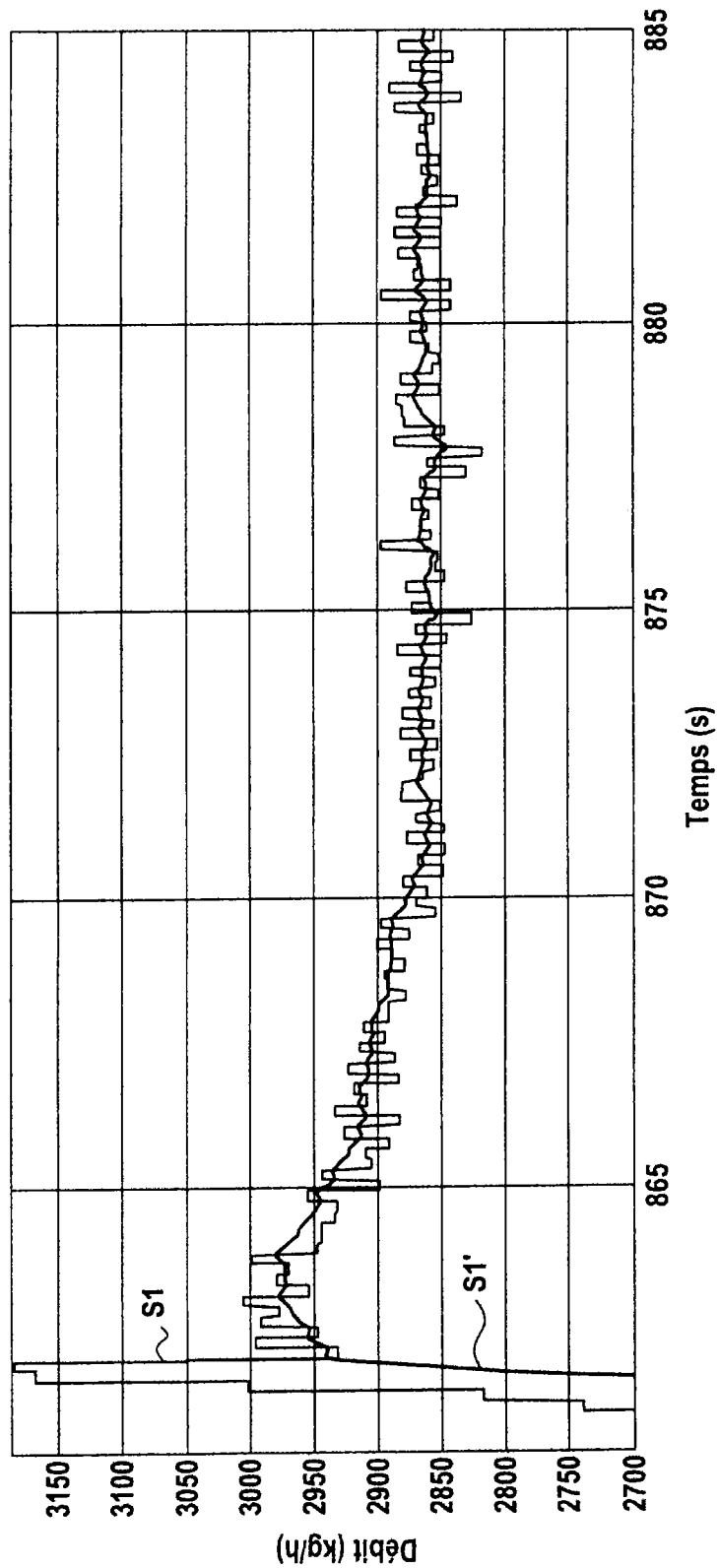
FIG. 3 shows an example of a signal delivered by a flow meter such as the flow meter used in the production device of FIG. 2, together with the signal obtained after filtering.

In this example, the signal S1 delivered by the flow meter 6 is in the form of steps as shown by way of indication in FIG. 3.

In order to enable it to be used in producing the setpoint signal C1, the Signal S1 is filtered by a lowpass digital filter 8A that is adapted to smooth the signal S1, in other words to eliminate its steps. For this purpose, its time constant τ is selected to be sufficiently high. The time constant is determined experimentally: the time constant selected is the smallest that enables a smooth signal to be obtained after filtering (preferably a constant of less than 1000 seconds (s)). It should be observed that a time constant that is too long, although having no influence on the stability of the system, could lead to the value of the setpoint signal C1 being wrong by making it converge towards the value of the signal S2.

The signal obtained at the output from the filter 8A is written S1'.

By way of indication, FIG. 3 shows the signal S1' as obtained after filtering the signal S1 that is shown on the same figure, the signal S1' being obtained using a lowpass digital filter selected to eliminate the steps from the signal S1.

In parallel with the processing applied to the signal S1, the signal S2 is supplied as input to a digital modeling module 8B. The module 8B is adapted to model the fuel flow rate as theoretically measured by the flow meter 6 when a flow of fuel represented by the signal S2 is passing therethrough. The signal modeled by the module 8B and representative of the fuel flow rate measured by the flow meter 6 is written S3.

The module 8B relies on a digital model of the mechanical elements of the flow meter 6 and it takes account in particular of its time constant τ6. In this example, the time constant τ6 is assumed to be constant and equal to the time constant as supplied by the manufacturer of the flow meter. It should be observed that such a digital model is known and is not described in greater detail herein.

Since the module 8B models the flow meter 6, it follows that the modeled signal S3 is likewise a stepped signal, in a manner similar to the signal S1.

A lowpass digital filter 8C is therefore provided similar to the digital filter 8A (and in particular having the same time constant τ) in order to smooth the stepped signal. In the presently-described example, the filters 8A and 8C are identical.

The smoothed signal S3' obtained at the output from the filter 8C is then supplied to a subtracter element 8D that is adapted to subtract the signal S3' from the signal S2.

The signal S4 that results from this subtraction operation is then added by means of an adder element 8E to the signal S1' issued by the filter 8A so as to form the setpoint signal C1. The signal S4 is a compensation signal in the meaning of the invention.

The invention claimed is:

1. A production method for producing a first setpoint signal (C1) representative of a flow rate of fuel that a fuel metering device (2) having a slide valve is to supply to a system (4) for injecting fuel into a combustion chamber of a turbine engine, the position of the slide valve (2A) of the fuel metering device (2) being determined on the basis of the first setpoint signal (C1), said method comprising:
   obtaining a first signal (S1) representative of a measurement as delivered by a flow meter (6) of a flow rate of fuel injected into the combustion chamber;
   evaluating a second signal (S2) representative of the flow rate of fuel injected into the combustion chamber on the basis of a measurement (M) of the position of the slide valve (2A) of the fuel metering device (2);
   estimating a third signal (S3) representative of the measurement delivered by the flow meter (6) by applying a digital model (8B) of the flow meter (6) to the second signal (S2); and
   producing the first setpoint signal (C1) by adding a compensation signal (S4) to the first signal (S1), the compensation signal (S4) being obtained by subtracting the third signal (S3) from the second signal (S2).

2. A production method according to claim 1, wherein:
   the first signal (S1) is in the form of steps and is filtered by a first lowpass digital filter (8A) suitable for smoothing the steps prior to being added to the compensation signal (S4); and
   the third signal (S3) is filtered by a second lowpass digital filter (8C) before being subtracted from the second signal (S2) in order to form the compensation signal (S4).

3. A supply method for supplying a setpoint signal (C) to a fuel metering device (2) having a slide valve (2A) in a turbine engine, the position of the slide valve (2A) of the fuel metering device (2) being determined from the setpoint signal (C), said method comprising:
   producing the first setpoint signal (C1) by using the production method according to claim 1;
   supplying the first setpoint signal (C1) to the fuel metering device (2), if the first setpoint signal (C1) is greater than a predetermined threshold (THR);
   otherwise, supplying the fuel metering device (2) with the setpoint signal (C) obtained from at least one of the second signal (S2) and the first setpoint signal (C1).

4. A supply method according to claim 3, wherein, when the first setpoint signal (C1) is less than the predetermined threshold (THR), the setpoint signal (C) supplied to the fuel metering device (2) results from a combination between the second signal (S2) and the first setpoint signal (C1).

5. A production device (8) for producing a setpoint signal (C) representative of a fuel flow rate that a fuel metering device (2) having a slide valve (2A) is to supply to a fuel injection system (4) of a combustion chamber in a turbine engine, the position of the slide valve (2A) of the fuel metering device (2) being determined from the setpoint signal (C), said device comprising:
   a first signal (S1) representative of a measurement as delivered by a flow meter (6) of a fuel flow rate injected into the combustion chamber;
   a second signal (S2) representative of the flow rate of fuel injected into the combustion chamber on the basis of a measurement (M) of a position of the slide valve (2A) of the fuel metering device (2);
   a third signal (S3) representative of the measurement delivered by the flow meter (6) by applying a digital model (8B) of the flow meter (6) to the second signal (S2); and
   an adder (8E) producing a first setpoint signal (C1) by adding a compensation signal (S4) to the first signal (S1), the compensation signal (S4) obtained by subtracting the third signal (S3) from the second signal (S2).

6. A production device (8) according to claim 5, wherein the first signal (S1) presents a waveform with steps, said production device (8) further comprising
   a first lowpass digital filter (8A) suitable for smoothing the steps of the first signal (S1) and a second digital filter (8C) similar to the first lowpass digital filter (8A), the first signal (S1) being filtered by the first lowpass digital filter (8A) before being added to the compensation signal (S4), and the third signal (S3) being filtered by the second digital filter (8C) before being subtracted from the second signal (S2) to form the compensation signal (S4).

7. A supply system (1) for supplying a setpoint signal (C) to a fuel metering device (2) having a slide valve (2A) in a turbine engine, a position of the slide valve (2A) of the fuel metering device (2) being determined from the setpoint signal (C), said system comprising:

a production device (8) comprising:
- a first signal (S1) representative of a measurement as delivered by a flow meter (6) of a fuel flow rate injected into a combustion chamber of the turbine engine;
- a second signal (S2) representative of the flow rate of fuel injected into the combustion chamber on the basis of a measurement (M) of the position of the slide valve (2A) of the fuel metering device (2);
- a third signal (S3) representative of the measurement delivered by the flow meter (6) by applying a digital model (8B) of the flow meter (6) to the second signal (S2); and
- an adder (8E) producing a first setpoint signal (C1) by adding a compensation signal (S4) to the first signal (S1), the compensation signal (S4) obtained by subtracting the third signal (S3) from the second signal (S2);

a subtractor (10) generating a subtractor signal by subtracting the second signal (S2) from the first setpoint signal (C1);

a comparator (9) generating an alpha signal by comparing the first setpoint signal (C1) with a predetermined threshold (THR), the alpha signal having a numerical value of one when the first setpoint signal (C1) is greater than the predetermined threshold (THR), otherwise the numerical value of the alpha signal is equal to zero;

a multiplier (11) generating a multiplier signal by multiplying the subtractor signal by the alpha signal; and an adder (12) generating the setpoint signal (C) by adding the second signal (S2) with the multiplier signal, wherein the setpoint signal (C) supplied to the fuel metering device (2) is:
- the first setpoint signal (C1) when the first setpoint signal (C1) is greater than the predetermined threshold (THR); or
- a second setpoint signal obtained from at least one of the second signal (S2) and the first setpoint signal (C1) when the first setpoint signal (C1) is not greater than the predetermined threshold (THR).

8. A turbine engine including the system (1) according to claim 7 for supplying the setpoint signal (C) to the fuel metering device (2) having the slide valve (2A).

* * * * *